Aug. 18, 1931.                G. BELFILS                1,819,860

DYNAMO ELECTRIC MACHINE

Filed Jan. 7, 1930

Inventor:
Georges Belfils,
By Charles E. Tullar
His Attorney.

Patented Aug. 18, 1931                                  1,819,860

UNITED STATES PATENT OFFICE

GEORGES BELFILS, OF BELFORT, FRANCE, ASSIGNOR TO GENERAL ELECTRIC COMPANY, A CORPORATION OF NEW YORK

DYNAMO-ELECTRIC MACHINE

Application filed January 7, 1930, Serial No. 419,184, and in France January 19, 1929.

My invention relates to the ventilation of rotors of dynamo-electric machines.

In rotors for dynamo-electric machines, as heretofore constructed, it is difficult to obtain satisfactory ventilation of the end-turns of the rotor winding and, particularly, when the machine is designed for high speed operation such, for example, as turbo-generators. This is due to the fact that the end-turns of the winding must be secured in place against the action of high centrifugal force, and this requires the use of binding bands or shrink rings surrounding the end-turns and insulating spacing members between them. In such a construction the shrink rings and spacing members greatly interfere with the circulation of adequate cooling air through the end-turns of the rotor during its operation.

The object of my invention is to provide an improved ventilating arrangement for high speed dynamo-electric machines which will not interfere with a satisfactory mechanical construction for retaining the end-turns of the windings of the rotors in place against the action of centrifugal force. I accomplish this by arranging spacing members between the end-turns of the rotor windings which impel air for ventilating the winding.

My invention will be more fully set forth in the following description referring to the accompanying drawings, and the features of novelty which characterize my invention will be pointed out with particularity in the claims annexed to and forming a part of this specification.

Figure 1:
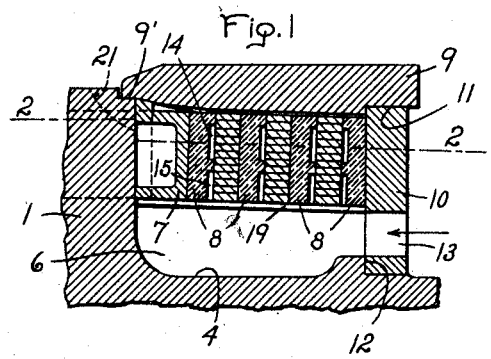
Figure 2:
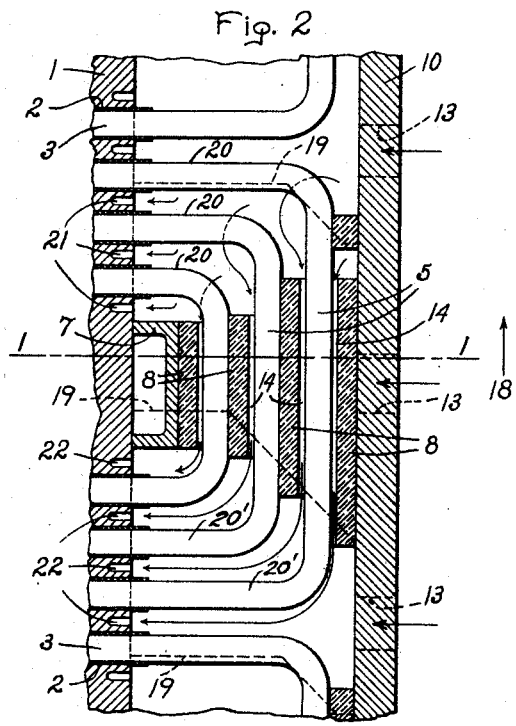
Figure 3:
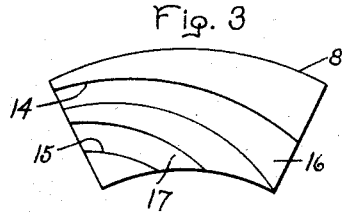

In the drawings Fig. 1 is a fragmentary longitudinal section of the rotating field of a turbo-alternator embodying my invention; Fig. 2 is a section approximately on the line 2—2 of Fig. 1, the winding being shown in elevation, and Fig. 3 is a side elevation of a spacing member made in accordance with my invention.

As an example of one manner of carrying out my invention, I have shown a rotor of a turbo-alternator including a core structure 1 which is slotted at 2 to receive the turns of the field exciting winding 3. The core structure is reduced in diameter at the ends thereof, as indicated at 4, and end-turns 5 of the field exciting winding 3 are flattened and curved to conform to the surface of the rotor and extend circumferentially of the core structure. The field exciting windings 3 are spaced from the portion 4 of the core structure which is reduced in diameter to form an air passage 6 beneath the end-turns. The portion of the field exciting winding 3 in the slots of the core structure are retained in place by wedges or other suitable devices (not shown) and the end-turns 5 are retained in the desired spaced relation to each other by a space block 7 and insulating spacing members 8 between the end-turns. The end-turns and spacing blocks are retained in place against the action of centrifugal force by an annular shrink ring 9, or other suitable means, which fits on the core structure, as indicated at 9'. The shrink ring and end-turns and spacing members are secured in place by a clamping ring 10 which fits within the counterbore 11 of the shrink ring and against the shoulder 12 formed on the core structure. The clamping ring 10 is bolted to the core structure and is provided with openings 13 for admitting air to the annular passage 6 formed between the end-turns 5 and the portion 4 of the core structure of reduced diameter.

In rotor structures of this type, as heretofore constructed, the spacing members 8 prevent the circulation of air between the portion of the end-turns 5 engaged by the spacing members. This results in undue heating of the end-turns. In accordance with my invention, these portions of the end-turns of the field exciting winding are adequately cooled by providing grooves 14 and 15 in one face of the spacing members which are slightly enlarged at 16 and 17 at the ends thereof facing in the direction of rotation of the rotor indicated by the arrow 18 in Fig. 2. I prefer to arrange baffle plates 19 inside of the end-turns of the field exciting winding which extend over substantially one-half of the end-turns of the winding of each pole, so that the air passing into the annular passage 6 will be directed toward the leading half 20 of the end-turns of each pole for cooling the same. A portion of the air circulates over the leading half 20 of the end-turns and is discharged through slots 21 formed in the core structure. The remainder of the air is impelled by the grooves 14 and 15 in each of the spacing members 8 so that it flows, as indicated by the arrows in Fig. 2, between the trailing half 20' of the end-turns of the winding of each pole, and between the baffle plate 19 and the shrink ring 8 from whence it is discharged through grooves 22 forming the core structure.

It will be seen from the foregoing that I have provided an improved ventilating arrangement for rotors of dynamo-electric machines, in which the spacing members for the end-turns of the winding are utilized for impelling air through the winding for ventilating the same.

Although I have shown my invention in connection with a turbo-alternator, I do not desire my invention to be limited to the particular construction disclosed, and I intend in the appended claims to cover all modifications which do not depart from the spirit and scope of my invention.

What I claim as new and desire to secure by Letters Patent of the United States, is,—

1. A rotor for dynamo-electric machines having a slotted core structure reduced in diameter at the ends thereof, a winding arranged in the slots of said core structure and having end-turns extending axially of the rotor beyond the slots, said end-turns being spaced from the bottom of said rotor of reduced diameter to form an air passage, and means including spacing members between said end-turns for impelling air to ventilate the winding, said spacing members having circumferentially and outwardly extending openings therein.

2. A rotor for dynamo-electric machines having a slotted core structure reduced in diameter at the ends thereof, a winding arranged in the slots of said core structure and having end-turns extending axially of the rotor beyond the slots, said end-turns being spaced from the portion of said rotor of reduced diameter to form an air passage opening to the surrounding air, baffles between a portion of said end-turns and said air passage to restrict the flow of air to a portion of the end-turns, and means including spacing members between said end-turns for impelling air between them to the remainder of said end-turns, said spacing members having circumferentially and outwardly extending grooves on the faces thereof adjacent said end-turns.

In witness whereof, I have hereunto set my hand.

GEORGES BELFILS.